United States Patent [19]
Stephens

[11] 3,932,839
[45] Jan. 13, 1976

[54] PATTERN ANALYSIS APPARATUS AND METHOD

[76] Inventor: Richard G. Stephens, 318 Security Mutual Life Bldg., Binghamton, N.Y. 13901

[22] Filed: Apr. 24, 1974

[21] Appl. No.: 463,723

[52] U.S. Cl............... 340/146.3 AG; 340/146.3 R; 235/92 PC
[51] Int. Cl.² ......................................... G06K 9/12
[58] Field of Search ....... 235/92 PC; 340/146.3 AG, 340/146.3 AE, 146.3 Y, 146.3 D; 178/7.6; 324/71 CP; 356/103, 104, 71

[56] References Cited
UNITED STATES PATENTS

| | | | |
|---|---|---|---|
| 3,790,883 | 2/1974 | Bergegere | 324/71 CP |
| 3,863,056 | 1/1975 | Klein | 235/92 PC |

*Primary Examiner*—Joseph M. Thesz, Jr.

[57] ABSTRACT

Method and apparatus for providing data values characteristic of objects having many different levels of light remissivity, or shades of grey, includes scanning an object to derive density and density gradient signals, accumulating signals falling within each of a plurality of gradient ranges either separately or in terms of predetermined combinations of gradient ranges, accumulating signals within a given density range which are substantially simultaneously accompanied by, or with a predetermined delay accompanied by signals falling within each of a plurality of gradient ranges either separately for each gradient range or in terms of combinations of gradient ranges, and accumulating signals within a given density gradient range which are substantially accompanied by, or with a predetermined delay accompanied by, signals falling within each of a plurality of density ranges either separately for each density range or in terms of predetermined combinations of density ranges.

20 Claims, 8 Drawing Figures

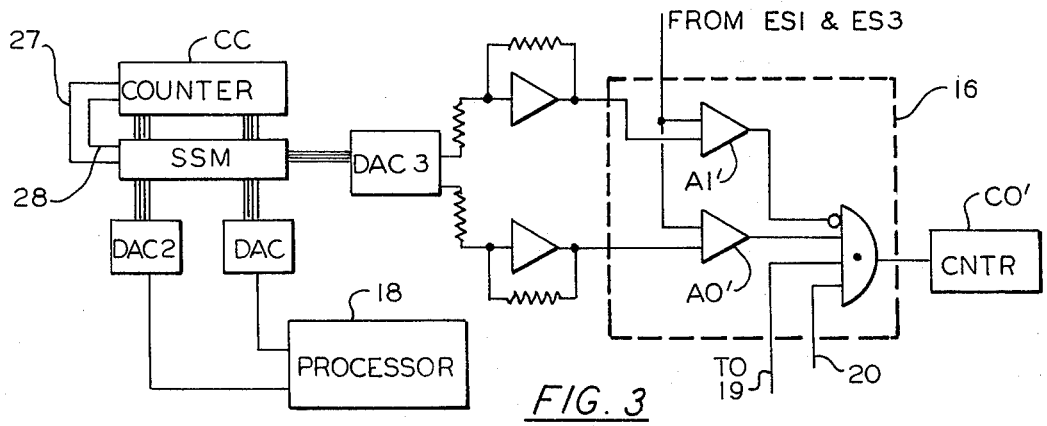
FIG. 2a
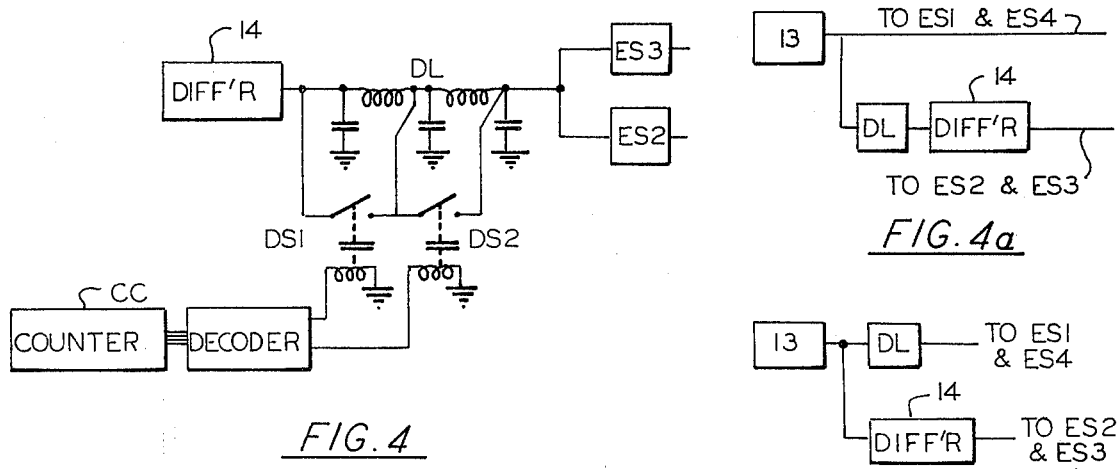
FIG. 3
FIG. 4
FIG. 4a
FIG. 4b

PATTERN ANALYSIS APPARATUS AND METHOD

This invention relates to method and apparatus for analyzing or classifying patterns, typified by biological samples, which contain much fine detail and elemental areas having many different optical remissivities, or shades of grey. In many respects the present invention is an improvement to method and apparatus disclosed in U.S. Pat. No. 3,705,383.

Various prior art systems have been proposed, for use in making differential counts of blood cells, for example, in which an object such as a blood cell is optically scanned through a microscope with a television camera. In order that fine cell features be detected the cell is scanned with high resolution (e.g. a fraction of a micron) and numerous (e.g. 255) different optical density levels were detected. Scanning with such resolution provided a very large number (many thousands) of elemental areas, the individual optical densities of which were detected and recorded, and then analyzed by digital computer processing. The large mass of data provided by use of such a technique required such large amounts of data storage, such complex programming and so much computer time that it was impractical for routine, real-time or on-line use. The system of U.S. Pat. No. 3,705,383 overcame that problem to some extent by use of a method which consolidates some of the information contained in the scanned pattern. More specifically, the patent discloses a process of detecting the instants during scanning when a video signal lies within each of a plurality of ranges representing density ranges, and accumulating signals for each of those ranges, so that upon the completion of scanning a plurality of count values characteristic of the pattern are obtained, one count value for each density range. The system of the patent has the advantage over the first-mentioned system that only a few dozens, or at most several hundred data values, rather than many thousands of data values, need be recorded and then computer analyzed. However, by consolidating the scanning-derived data in such a manner, the systems of the patent ignore a large percentage of the data detectable from scanning the pattern.

To better distinguish or discriminate between different classes of patterns, such as between different types of blood cells, for example, it is often desirable that somewhat more data be made available for processing, but desirable that it be made available without reverting to the first-mentioned type of system wherein far too much data had to be stored and manipulated. A primary object of the present invention is to provide pattern analysis method and apparatus wherein useful data in addition to that provided by the system of U.S. Pat. No. 3,705,383 may be obtained at very little added cost, or data different from that obtained by the prior patented system may be obtained.

The amount of data which it is desirable to provide to characterize the scanned item depends largely upon the nature of the item to be scanned, and upon how closely the scanned item must be found to resemble or differ from other items of a class. For example, a set of data sufficient to distinguish a scanned item from one set of known items may be insufficient to allow the item to be distinguished from each of a larger set of known items. For some applications the system of U.S. Pat. No. 3,705,383 may be deemed to make too severe a reduction, in a step-like fashion, in the amount of available data. In order that a given piece of equipment be useful for varied applications, such as widely different types of biological samples, it is desirable that one be able to vary the amount of data which is produced to suit the analysis task at hand, and another object of the present invention is to provide improved method and apparatus which may provide different amounts of data, in gradual increases, as gradually more difficult analysis tasks are encountered.

The data values provided by the system of the prior patent comprise values of a histogram characteristic of the pattern scanned, with the number of data values equal to the number of density ranges which are detected. The number of density ranges which are detected substantially affects the total cost and/or the operating time of systems constructed in accordance with the patent. One object of the present invention is to provide improved method and apparatus by means of which second, third and even many more histograms also characteristic of the scanned pattern may be provided at little added cost.

The systems of U.S. Pat. No. 3,705,383 process a video signal $e_v$ to determine the time intervals during which the signal lies within each of a plurality of different voltage ranges, with each voltage range representing a respective range of densities. The density ranges may be identified as $r_0, r_1, r_2, - - - r_n$. Signals are fed to a respective accumulator while signal $e_v$ lies within a respective range, and after the area containing the object has been scanned, the counts tallied in the counters each represent the total amount or area of the scanned field having elemental areas falling within a respective density range. The amount of scanned area falling within density range $r_0$ may be designated as the quantity $A_{r0}$, that falling within range $r_1$ as quantity $A_{r1}$, etc. Thus the system of the prior patent provides, in order to characterize the scanned pattern, the set of quantities $A_{r0}, A_{r1}, A_{r2}, - - - A_{rn}$ which form a single histogram. Increasing the number n of density ranges requires an increased amount of equipment, or if time-sharing is used, an increased operating time.

In accordance with a first aspect of the present invention, a second set of histogram values is provided by differentiating density signal $e_v$ to provide density gradient signal $e_d$, detecting the time intervals during which signal $e_d$ lies within each of a plurality of m ranges of density gradients, separately accumulating signals for each respective range of density gradients. The density gradient ranges may be designated $g_0, g_1, g_2, - - - g_m$. At the end of scanning, the invention thus may provide a second set of values $A_{g0}, A_{g1}, A_{g2}, - - - A_{gm}$, each of which represents the total amount or area of the scanned field having density gradients falling within a respective one of gradient ranges $g_0 - - - g_m$. Thus it is an additional object of the present invention to provide method and apparatus for analyzing an object which includes detecting the time intervals during which a signal commensurate with the rate of change of density of a scanned object lies within each of a group of different ranges of density gradients, and accumulating signals either separately for each respective range of density gradients or in terms of predetermined combinations of density gradient ranges.

The quantity $A_{r0}$ representing the total amount of scanned area falling within density range $r_0$ may be deemed to be comprised of a plurality of components, each component being associated with a different density gradient, as stated by the following relationship.

$$A_{r0} = A_{r0g0} + A_{r0g1} + A_{r0g2} \cdots A_{r0gm} \qquad (1)$$

Similarly, the other area quantities $A_{r1}$ to $A_{rn}$ may be expressed as:

$$A_{r1} = A_{r1g0} + A_{r1g1} + A_{r1g2} \cdots A_{r1gm} \qquad (2)$$

to $$A_{rn} = A_{rng0} + A_{rng1} + \cdots A_{rngm} \qquad (3)$$

In accordance with a second aspect of the present invention, n further histograms (or more or less) may be provided by detecting, whenever density signal $e_v$ lies within a given range, such as a range of the group $r_0$ to $r_n$, which of the density gradient ranges of the group $g_0$ to $g_m$ it simultaneously falls within, and separately accumulating signals for the different density gradient ranges. Thus it is an additional object of the present invention to provide method and apparatus for analyzing an object which includes detecting the time intervals during which a signal commensurate with the density of a scanned object and falling within predetermined range of density levels simultaneously has a density gradient which falls within each of a plurality of density gradient ranges, and accumulating signals separately for the different density gradient ranges, or in terms of predetermined combinations of density gradient ranges.

The quantities $A_{g0}$ to $A_{gm}$ each representing the amount of scanned area falling within a respective range of gradients also may be deemed to be comprised of plural components, each of which components is associated with a different density range, as indicated by the following relationships.

$$A_{g0} = A_{r0g0} + A_{r1g0} + A_{r2g0} \cdots A_{rng0} \qquad (4)$$

to $$A_{gm} = A_{r0gm} + A_{r1gm} + A_{r2gm} \cdots A_{rngm} \qquad (5)$$

In accordance with a third aspect of the present invention, m further histograms may be provided by detecting, whenever density gradient signal $e_d$ lies within a given range of the group $g_0$ to $g_m$, which of the density ranges of the group $r_0$ to $r_n$ it simultaneously falls within, and separately accumulating signals for the different density ranges. Thus it is a further object of the present invention to provide method and apparatus for analyzing an object which includes detecting the time intervals during which a signal commensurate with the density gradient of a scanned object falls within a predetermined range of density gradient levels simultaneously with the presence of a second signal commensurate with the density of the object falling within each of a plurality of density ranges, and either separately accumulating signals for the density ranges or accumulating signals for predetermined combinations of density ranges.

Thus, rather than providing merely one histogram comprising in values to characterize the pattern, use of the above procedures allows the present invention to provide as many as $(2 + m + n)$ histograms, including $(m + 1)$ histograms each having $n$ values and $(n + 1)$ histograms each having m values, and, in fact, many more, as will be seen below. This ability to provide much more data characteristic of the scanned object may be obtained with very little added cost. Certain applications will not require, of course, that complete data for all of the $(2 + m + n)$ histograms be provided. In many applications of the invention the number $n$ of density ranges conveniently will be made to equal the number m of density gradient ranges, although that is not at all a requirement in the present invention.

As will be seen below, the method and apparatus of the present invention also may use, but need not use, the method of prior patent, since certain data values provided in accordance with the methods of the present invention may be readily manipulated, if desired, to provide the values provided by the prior art technique, such as by simple addition steps.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

FIG. 2a is a geometrical diagram of a theoretical portion of an object to be scanned where the object is comprised of elemental areas having numerous different density levels.

FIG. 3 is a schematic diagram illustrating one form of modifications which may be made to the apparatus of FIG. 1.

FIG. 4 is a schematic diagram illustrating another modification which may be made to the apparatus of FIG. 1.

FIGS. 4a and 4b are block diagrams illustrating two alternative modifications which may be made to the apparatus of FIG. 1.

Figure 2B:
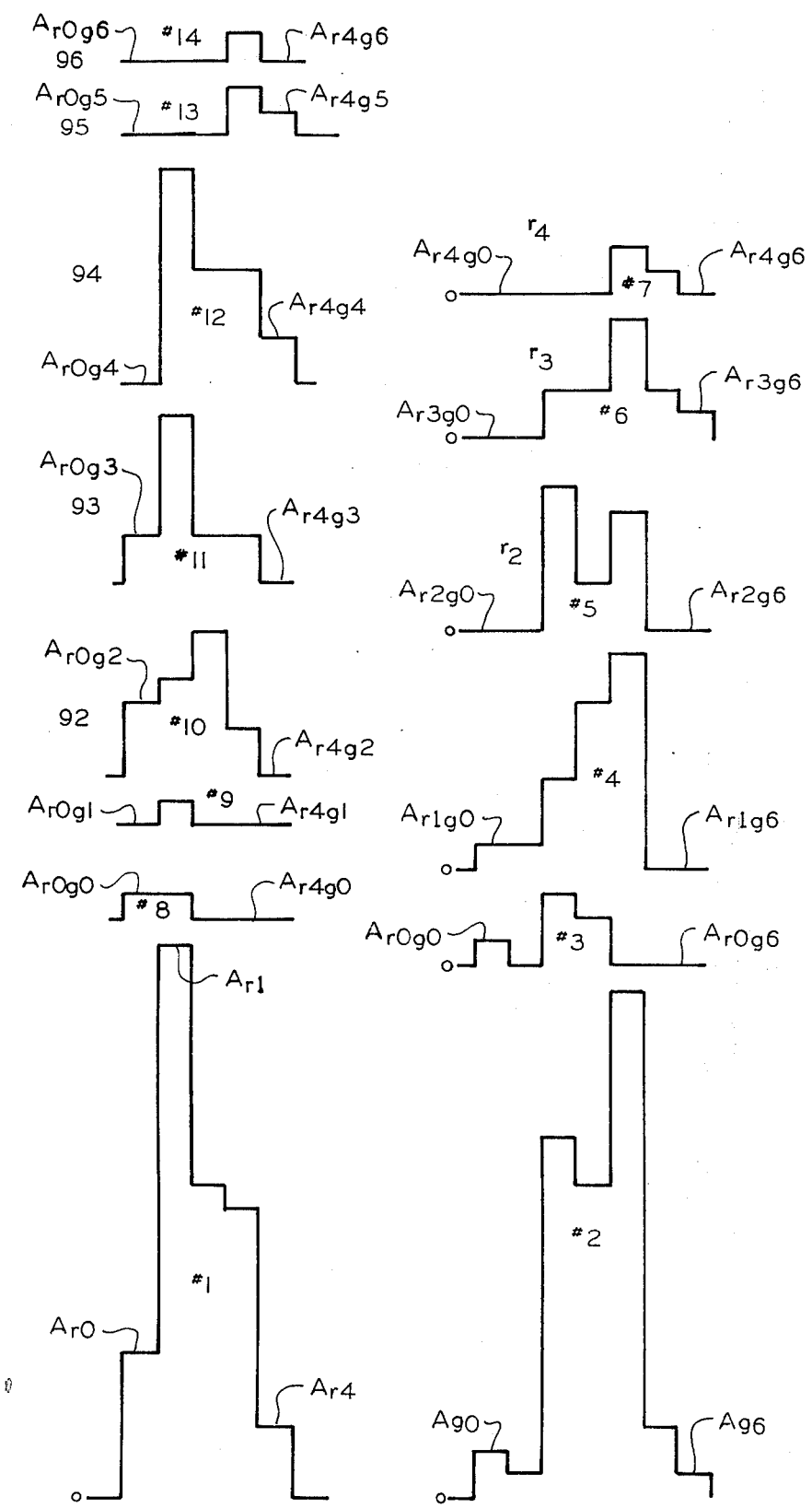
FIGS. 2b and 2c are sets of histograms based on analysis of FIG. 2a and useful in understanding some concepts of the present invention.

In FIG. 2a the large matrix of squares may be deemed to represent a portion of an object being scanned, with each of the smaller squares representing an individual elemental area. The large numeral in the middle of each elemental area represents an assumed density for that elemental area, numerals 0 through 4 being related to density ranges $r_0$ through $r_4$, respectively. Only five ranges are assumed, for sake of simplicity. The small numeral in the upper right-hand corner of each elemental area represents an assumed density gradient for that area, the value being determined by noting the density change between each elemental area and the adjacent area to its left. Determining gradients in such a fashion does not, of course, provide the actual gradient across a given area but it provides an approximation and allows a simplified analysis. If one performs the process which is performed by the prior patent, and also shown below being performed by the present invention during a first scanning field, of detecting and totalizing the number of elemental areas falling within each density range, one derives the following count values from FIG. 2a, which values are shown plotted as histogram # 1 in FIG. 2b.

| $A_{r0}$ | $A_{r1}$ | $A_{r2}$ | $A_{r3}$ | $A_{r4}$ |
|---|---|---|---|---|
| 6 | 22 | 13 | 12 | 3 |

If one then performs a further process in accordance with the invention, separately totalizing gradient values for each density gradient range, one derives the following count values, which are shown plotted as histogram #2 in FIG. 2b.

| $A_{g0}$ | $A_{g1}$ | $A_{g2}$ | $A_{g3}$ | $A_{g4}$ | $A_{g5}$ | $A_{g6}$ |
|---|---|---|---|---|---|---|
| 2 | 1 | 15 | 13 | 21 | 3 | 1 | where gradient values from −3 to +3 are listed as falling within gradient ranges $g_0$ through $g_6$, respectively. If one then performs a series of further processes in accordance with the invention, detecting for each density range how much area of a given density gradient value is present, one may obtain the following sets of quantities.

| $A_{r0g0}$ | $A_{r0g1}$ | $A_{r0g2}$ | $A_{r0g3}$ | $A_{r0g4}$ | $A_{r0g5}$ | $A_{r0g6}$ |
|---|---|---|---|---|---|---|
| 1 | 0 | 3 | 2 | 0 | 0 | 0 |
| $A_{r1g0}$ | $A_{r1g1}$ | $A_{r1g2}$ | $A_{r1g3}$ | $A_{r1g4}$ | $A_{r1g5}$ | $A_{r1g6}$ |
| 1 | 1 | 4 | 7 | 9 | 0 | 0 |
| $A_{r2g0}$ | $A_{r2g1}$ | $A_{r2g2}$ | $A_{r2g3}$ | $A_{r2g4}$ | $A_{r2g5}$ | $A_{r2g6}$ |
| 0 | 0 | 6 | 2 | 5 | 0 | 0 |
| $A_{r3g0}$ | $A_{r3g1}$ | $A_{r3g2}$ | $A_{r3g3}$ | $A_{r3g4}$ | $A_{r3g5}$ | $A_{r3g6}$ |
| 0 | 0 | 2 | 2 | 5 | 2 | 1 |
| $A_{r4g0}$ | $A_{r4g1}$ | $A_{r4g2}$ | $A_{r4g3}$ | $A_{r4g4}$ | $A_{r4g5}$ | $A_{r4g6}$ |
| 0 | 0 | 0 | 0 | 2 | 1 | 0 |

These five sets of values are plotted as histograms #3 through #7 in FIG. 2b.

If one then performs a further process in accordance with the invention, detecting for each density gradient range how much area of a given density gradient is present, one may obtain the following sets of values, which are plotted as histograms #8 through #14 in FIG. 2b.

| | | | | |
|---|---|---|---|---|
| 1 | 1 | 0 | 0 | 0 |
| 0 | 1 | 0 | 0 | 0 |
| 3 | 4 | 6 | 2 | 0 |
| 7 | 2 | 2 | 2 | 0 |
| 5 | 4 | 5 | 5 | 2 |
| 0 | 0 | 0 | 2 | 1 |
| 0 | 0 | 0 | 1 | 0 |

It should be noted that the rows of values in the last table correspond to the columns of values in the preceding table. In the above geometrical exercise the number $n$ of density ranges assumed was only five and the number $m$ of gradient ranges assumed was only seven, for sake of simplicity, and much larger values may be used for either $n$ or $m$ in actual practice. It will be readily apparent that the additional histogram sets of data values provide considerably more information useful in classifying the scanned object than the single histogram set (#1) provided by the prior art patent.

It should be noted that histograms #3 through #7, if all added together will give histogram #2, and that histograms #8 through #14, if all added together will give histogram #1.

Figure 2C:
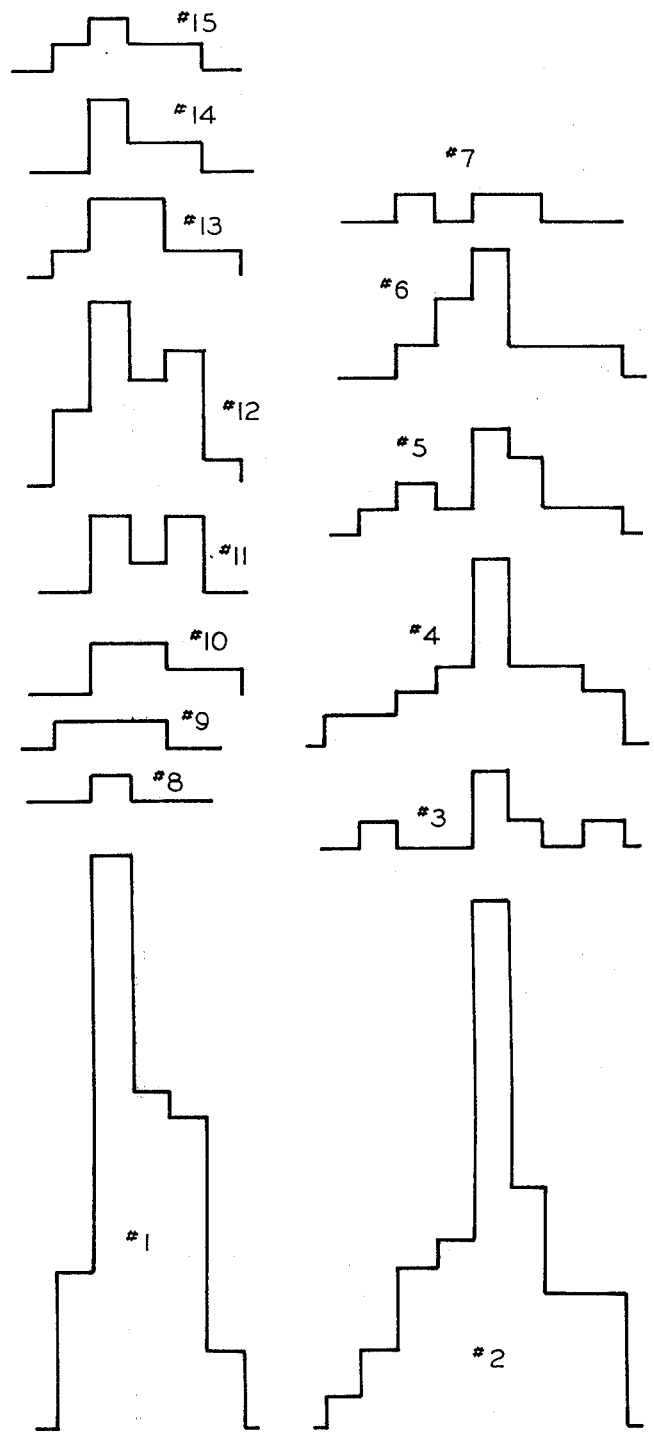

In FIG. 2a the numeral in the lower left corner of each square represents a density gradient determined in a different fashion, being determined for each elemental area by taking the difference between the density values on the left and right sides of each small square, with all values outside the matrix assumed to be zero. Designating the gradient values −4 to +3 as falling with gradient ranges $g_0$ to $g_7$, and then following the same processes used in connection with FIG. 2b one may obtain the histograms of FIG. 2c. Histogram #1 of FIG. 2c corresponds exactly to that of FIG. 2b, since no change was made in the density values, but the other histograms of FIG. 2c will be seen to differ from those of FIG. 2b. As previously though, histogram #2 in FIG. 2c is the sum of histograms #3 through #7 of FIG. 2c, and histogram #1 is the sum of histograms #8 through #15 of FIG. 2c. One more histogram is shown in FIG. 2c than in FIG. 2b because one more density gradient range was used in FIG. 2c. From a comparison of the histograms of FIGS. 2b and 2c one may deduce that the density gradient histogram (#2 in each of FIGS. 2b and 2c), and all of the other histograms except the two density histograms (#1 in each of FIGS. 2b and 2c) differ between the two Figures, from which one may readily deduce that all the histograms, except the type of the prior patent, are very dependent upon the manner in which the density gradient values are obtained. As will be shown below, this fact allows one to derive many further histograms characteristic of a scanned pattern at little increased equipment cost.

Figure 1:
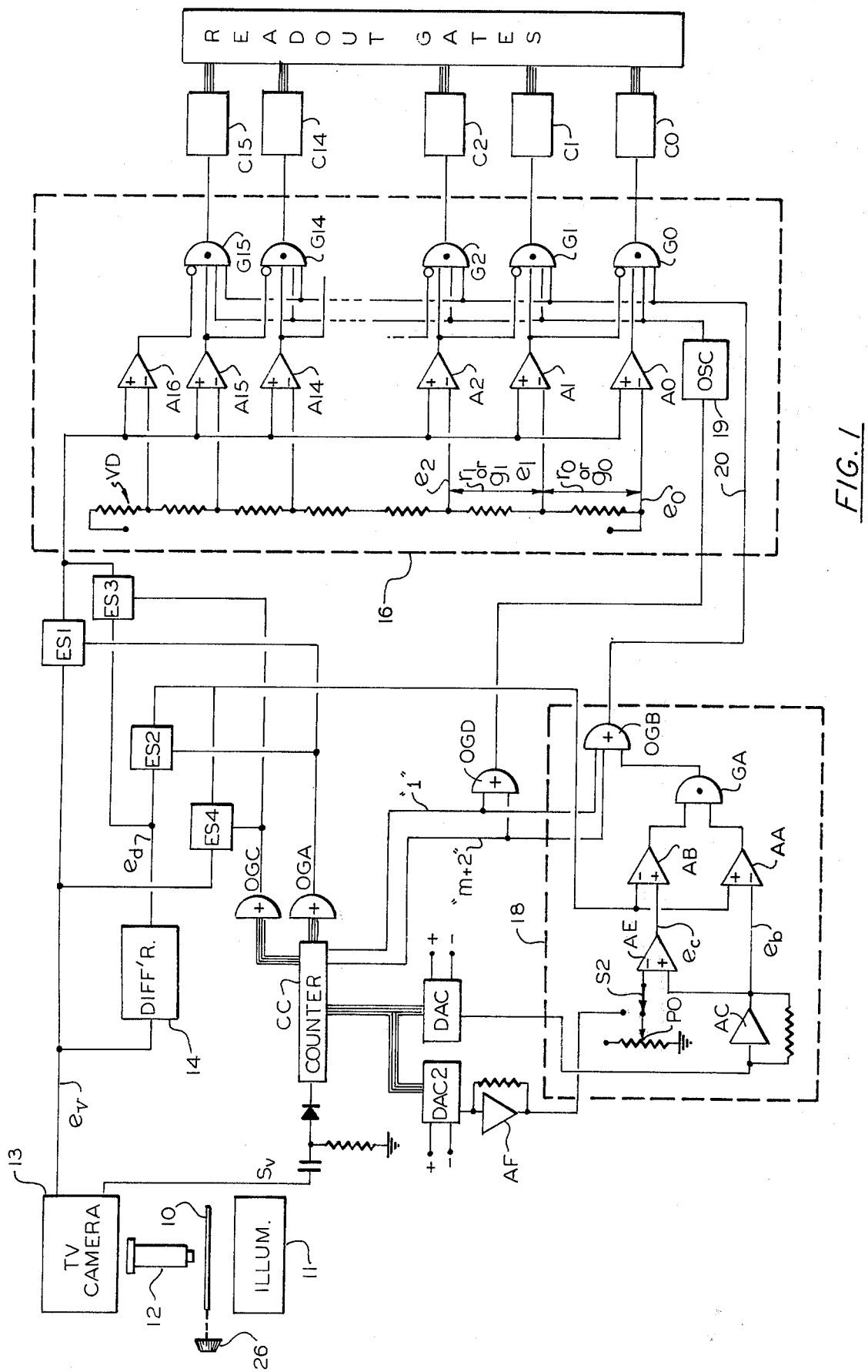
FIG. 1 is a schematic diagram, largely in block form, illustrating one exemplary form of apparatus constructed in accordance with and adapted to use the methods of the present invention.

In FIG. 1 a leukocyte or other biological sample (not shown) carried on glass slide 10 and illuminated by illuminator 11 is viewed through a microscope 12 by optical scanning means 13 such as a conventional television camera, which, when unblanked during each horizontal scan line, provides the video output signal $e_v$. The magnitude of signal $e_v$ will vary in accordance with the light sensed at a given instant, and in accordance with Lambert's law, will thus tend to vary logarithmically with the optical density or absorption of the elemental area of the pattern being scanned at a given instant. Camera 13 may be arranged to provide either more positive output or more negative output for a given change in the light which it senses, and camera 13 may include non-linear amplification, if desired, to provide any desired linear or non-linear output voltage versus received light characteristic. Thus signal $e_v$ is deemed to vary in accordance with optical density of the elemental area being scanned at a given instant, though not necessarily linearly, and for sake of convenience signal $e_v$ will be termed a density signal. Signal $e_v$ is applied to a differentiating circuit 14, shown as a simple block in FIG. 1, to derive signal $e_d$ which varies, at least approximately, in accordance with the time rate of change signal $e_v$. Signal $e_d$ will be termed the density gradient signal.

General control of the system shown in FIG. 1 is accomplished by control means shown as comprising ring counter CC, which is shown connected to be advanced to successive count conditions at the end of each scanning field, as by means of pulses obtained by differentiating the retrace (assumed to be positive) of the camera 13 vertical sweep waveform. To provide $(2 + n + m)$ histogram counter CC ordinarily will be provided with at least $(2 + n + m)$ count conditions, each of which control the system operation during a respective scanning field. A group of $m + 1$ output lines which are high during respective ones of the first $m + 1$ count conditions of counter CC are connected to OR gate OGA, thereby closing electronic switches ES1 and ES2. Thus density signal $e_v$ is applied during the first $m + 1$ scanning fields to signal-processor circuit 16, while density gradient signal $e_d$ is applied to signal-processor circuit 18. It will become clear below that more or less than $m + 1$ fields may be scanned under these conditions if desired.

Signal-processor circuit 16 is shown as comprising a group of n comparator amplifiers, only the first three (A0 to A2) and last three (A14 to A16) of which are shown, each of which amplifiers is connected to receive the $e_v$ density signal via switch ES1 as its non-inverting input terminal, and connected to receive a respective reference voltage at its inverting input terminal, from means shown as comprising voltage divider VD. Each of the comparator amplifiers is operated open-loop so that its output swings rapidly between its maximum positive and negative values as the sign of the sum of its pair of input voltages changes. Whenever signal $e_v$ is more positive than the reference voltage applied to a given comparator amplifier the output signal of the amplifier is positive so that it conditionally enables a respective gate of the group partially shown at G0 to G2 and G14 to G15, but each amplifier (other than the first) also applies an inhibiting signal to the gate associated with the adjacent lower comparator. Clock pulses are applied to the gates by means shown as comprising oscillator 19. Assuming line 20 which also feeds each of the gates is high, it will be seen that clock pulses will pass through gate G0 to advance counter C0 whenever signal $e_v$ lies between voltages $e_0$ and $e_1$, clock pulses will instead pass through gate G1 to advance counter C1 whenever signal $e_v$ lies between levels $e_1$ and $e_2$, etc. With density signal $e_v$ applied to amplifiers A0 to A16, the voltages at adjacent pairs of taps of the voltage divider define respective density ranges, voltages $e_0$ and $e_1$ defining range $r_0$, voltages $e_1$ and $e_2$ defining range $r_1$, etc. During further operation of the system in a later mode to be described below, the voltages at adjacent pairs of taps will instead define respective density gradient ranges, such as $g_0, g_1 - - - g_m$, for example. During the first scanning field the high 1 output line of counter CC applies a signal through OR gate OGB to maintain line 20 high, and thus during the first scanning field counts will be tallied in counters C0 through C15. At the end of the first field the count in each of counters C0 to C15 will represent the total amount or area of the scan field falling within a respective range of densities. Thus if signal-processor 16 has 16 channels as assumed, sixteen count values comprising a density histogram will be provided, of the nature of histograms # 1 in each of FIGS. 2b and 2c. The values will comprise the quantities $A_{r0}, A_{r1}, - - - A_{rn}$ in terms of the terminology heretofore used. At the end of each field the count values are read out of counters C0 to C15 to a storage device (not shown) and the counters are then reset to a reference count condition such as zero. Readout and resetting of the counters also may be timed by the camera vertical retrace in simple fashion needing no explanation. Such a set of count values as that described is the total amount of data which the system of U.S. Pat. No. 3,705,383 provides to characterize the scanned object.

During the first field signal-processor 18 which receives the $e_d$ density gradient signal is inactive, and it actually need not receive the $e_d$ signal. Gate OGB raises line 20 irrespective of the nature of the $e_d$ signal. During the second scanning field, however, and each successive field up to and including the $m + 1$ field, for example, the condition of line 20 is controlled by signal-processor 18, with processor 18 raising line 20 only when the density gradient signal lies between a pair of variable reference voltages $e_b$ and $e_c$ applied to comparator amplifiers AA and AB. The output lines of counter CC are connected to control digital-to-analog converter DAC, so that successive count conditions of counter CC cause converter DAC to apply successive different currents to amplifier AC, providing a different reference voltage $e_b$ to amplifier AA during successive fields. Potentiometer PO is shown applying a fixed input to amplifier AE, so that reference voltage $e_c$ from amplifier AE is always a fixed amount greater than reference voltage $e_b$. Thus with density gradient signal $e_d$ applied to comparators AA and AB, voltages $e_b$ and $e_c$ define a range of density gradients, and as counter CC and the DAC vary the input current to amplifier AC during successive fields, voltages $e_b$ and $e_c$ define successive ranges of density gradients, such as ranges $g_0, g_1, g_2$, etc. Use of a fixed input from potentiometer PO results in uniform size density gradient ranges, but varying sizes of density gradient ranges may be defined by a simple modification to be discussed below. During a later operating mode, voltages $e_b$ and $e_c$ will define a density range rather than a density gradient range, as will be seen below as the description proceeds.

Assuming voltages $e_b$ and $e_c$ define gradient range $g_0$ during the second scanning field, line 20 will be raised only while portions of the object having a density gradient within range $g_0$ are being scanned. Thus counter C0 will accumulate counts only when the density signal lies within density range $r_0$ and the gradient signal lies within gradient range $g_0$, for example, while counters C1 through C15 will accumulate counts when the density within other density ranges, but only while the gradient lies within range $g_0$. Thus at the end of the second field counters C0 to C15 will provide counts of the quantities $A_{r0g0}, A_{r1g0} - - - A_{rng0}$, providing a second histogram, generally of the nature of histogram # 2 in FIG. 2b or FIG. 2c. These values will be seen to correspond to the first values on the right-hand sides of expressions (1) to (3). Operation then may proceed in similar fashion during the third field, with counters C0 to C15 providing the quantities $A_{r0g1}, A_{r1g1}, A_{r2g1}, - - - A_{rng1}$ defining a third histogram, etc. It should be noted that any number of further fields may be scanned in similar fashion, with reference voltages $e_b$ and $e_c$ being increased (or decreased, if desired) during successive fields in steps as large or small as desired. Thus while it has been assumed that m fields are scanned after the first field with signal-processor 18 detecting m successive gradient ranges, it will be apparent that any other number of fields can instead be used. A set of data values defining a further histogram are provided at the end of each field.

After a desired number of histogram values have been provided in the manner described, counter CC will have been advanced to a count condition ($m + 2$ with the assumptions previously made), which causes the gate OGA output to open switches ES1 and ES2. The $m + 2$ and successive higher order output lines of counter CC are connected to OR gate OGC, so that switches ES3 and ES4 are closed during the $m + 2$ field and following fields. The $m + 2$ output line of counter CC is also connected to gate OGB to raise line 20 during the $m + 2$ field. Thus during the $m + 2$ field the density gradient signal $e_d$ is applied vis switch ES3 to signal processor 16, and the density signal $e_v$ is applied to signal-processor 18 via switch ES4. With counter CC applying an input to gate OGB during the $m+2$ field, it will be seen that signal processor 18 is inactive, just as it was during the first field.

During the $m+2$ field, with line 20 raised irrespective of the instantaneous level of the density signal, counters C0 to C16 will tally the quantities $A_{g0}$, $A_{g1}$, - - - $A_{gm}$ (assuming $m$ does not exceed 16, the number of channels provided in signal-processor 16) providing a further histogram of the nature of histogram #2 in FIG. 2b or 2c, each value of which histogram represents the total scanned area falling within a respective range of density gradients. During the next and following fields, line 20 will be raised only when, for a given field, the density signal value lies within a respective range, and during each of these fields counter CC and the DAC control the reference voltages $e_b$ and $e_c$ in the same manner as previously described, though with different values in many cases. Thus if the reference voltages $e_b$ and $e_c$ are arranged to define density range $r_0$ during the $m+3$ field, counters C0 to C15 will provide values at the end of the field of $A_{r_0g0}$, $A_{r_0g1}$, $A_{r_0g2}$, - - - $A_{r_0gm}$, i.e. values of the nature indicated by the first terms on the right sides of expressions (4) and (5). Similarly, if reference voltages $e_b$ and $e_c$ are arranged to define density range $r_1$ during the $m+4$ field, counter C0 to C15 will provide the quantities $A_{r_1g0}$, $A_{r_1g1}$, $A_{r_1g2}$, - - - $A_{r_1gm}$. Again, it is not necessary that the $e_b$ and $e_c$ voltage pairs define the same size density ranges as those previously defined by pairs of voltages from voltage divider VD, although it is contemplated that the same ranges may be used in many applications of the invention. At each field is scanned a further set of values providing a histogram characteristic of the scanned object may be provided, of the nature of those shown at #3, #4, etc. in FIG. 2b or 2c. After as many fields as desired are scanned in such a fashion counter CC arrives at a count condition which may be sensed to reset the system to its original condition, and if desired, to further transmit all of the data which has been stored to a digital computer, or to any common form of further data storage device.

The fact that signal processor 18 need not use density gradient ranges of uniform size or density ranges of uniform size is illustrated in FIG. 1 by considering switch S2 thrown, so that amplifier AE receives a variable input from digital-to-analog converter DAC2 via amplifier AF rather than the fixed input from potentiometer PO. Counter CC controls DAC2 in generally the same manner as it controls converter DAC. Counter CC need not comprise a ring counter and may comprise a simple binary (or other radix) counter, with gates OGA, OGB and OGC appropriately connected to decode the counter contents in a manner which will be readily apparent to those skilled in the art. The digital-to-analog converters each may comprise simple arrangements of switch-controlled resistor networks, and inexpensive switching may be used in these DACs since they need not switch at video speeds, but only between scanning fields. Counters C0 to C15 may comprise ordinary binary pulse counters, decimal pulse counters, or various other known types. Furthermore, rather than comprising digital pulse counters, each of accumulator devices C0 to C15 can instead comprise an electronic switch adapted to be closed by an output of a respective one of gates G0 to G15 to apply a predetermined voltage to a respective analog (Miller) integrator, thereby to provide output data in analog rather than digital form.

During those scanning fields when signal-processor 18 is active, counters C0 to C15 will tend, for most patterns which are scanned, to receive only small fractions of the numbers of counts they receive during the two fields when processor 18 is inactive. If desired, the clock rate may be increased when processor 18 is active so that the quantities tallied have greater resolution. In FIG. 1 gate OGD is connected to vary the oscillator 19 pulse rate for such a purpose. The oscillator 19 circuit preferably will include a crystal-controlled oscillator, and rather than varying the basic frequency of such an oscillator, the output of gate OGD may switch in and out one or more frequency divider flip-flops (not shown).

As thus far described, it has been assumed that fixed voltages are applied to the ends of voltage divider VD throughout the operation. It will be apparent that, if desired, in order to define desired density ranges and/or density gradient ranges, the voltages applied to divider VD may be changed for certain fields. As an extreme one can provide two more digital-to-analog converters (not shown) controlled by counter CC so as to provide different exciting voltages during every scanning field if desired. Less elaborately, one can use the output of gate OGA to control a pair of switches (not shown) to excite divider VD with one pair of voltages during those fields when divider output voltages represent density ranges, and use the output of gate OGC to control a further pair of switches (not shown) to apply a different pair of voltages to the ends of divider VD during those fields when divider output voltages represent density gradient ranges. Similar switching controlled by counter CC outputs may be used to vary attenuation or gain and/or the average DC level of either or both density signal $e_v$ and density gradient signal $e_d$.

While the output signals of gates G0 to G15 are shown connected to operate individual counters C0 to C15, so that each counter receives pulses from a single one of the gates, it is important to note that the system of FIG. 1 may be modified to utilize one or more alternative techniques fully disclosed in my prior copending application Ser. No. 444,951 filed on Feb. 22, 1974. For example, a counter such as counter C1 may comprise a bidirectional counter having its "up" input line connected to receive pulses from gate G1 and its "down" input line connected to receive pulses from gate G0, so that it would tally a difference between two of the quantities previously mentioned, tallying the quantity $(A_{r1} - A_{r0})$ during the first field, for example. As explained in the prior application, each of the other accumulators similarly may be reversible and converted to receive pulses from a pair of the gates (of group G0 to G15). As also explained in the prior application, reversible counters may be connected to receive different inputs during two or more fields without being reset between fields to provide desired count values characteristic of the scanned object.

While the signal-processor 16 in FIG. 1 comprises a bank of comparators A0 to A16 capable of simultaneously sensing either sixteen density ranges or sixteen gradient ranges, it is within the scope of the invention to provide fewer channels in processor 16 to detect as few as a single density range or density gradient range during a given scanning field. FIG. 3 illustrates portions of FIG. 1 modified so that processor 16 need include but a single pair of comparator amplifiers. In FIG. 3 rather than being connected to vary $e_b$ and $e_c$ reference voltages for each successive field, counter CC is arranged to apply the same pair of reference voltages to processor 18 for $r_n$ fields in succession when processor 16 is detecting density ranges, and to apply the same pair of reference voltages to processor 18 for m fields in succession when processor 16 is detecting gradient ranges. Digital-to-analog converter DAC 3 is controlled by counter CC to vary the voltages applied to divider VD of signal processor 18 during successive ones of each group of successive fields in which processor 18 receives the same voltages. Thus the single channel in processor 16 is time-shared between density ranges and then time-shared between density gradient ranges. A single count value will be provided by counter C0', of course, at the end of each scanning field. The arrangement of FIG. 3 requires the use of many more scanning fields, of course, to obtain the same data provided by the system of FIG. 1, and that more count conditions be provided in counter CC.

While the description thus far has assumed that successive scanning fields were arranged to provide output data in a particular sequence, one should note that such a sequence is in no way essential to the present invention. It will be apparent that the different fields may be made to occur in any desired sequence by mere re-connection of the counter CC output lines. In some applications it may be desirable to arrange the sequence so that the groups of histograms which should total to equal a given other histogram immediately precede or follow the other histogram, so that the stored data later may be manipulated in very simple fashion, by addition or subtraction, to determine whether such groups do indeed add up to equal the other histogram within given limits, thereby providing a check useful to indicate whether the apparatus operated properly and uniformly during a group of successive scanning fields.

In FIG. 3 the digital-to-analog converters are shown connected to counter CC via a selective switching means SSM, which may comprise, for example, a plurality of switches controlled by a punched card or a digital register which may be controlled by an external computer. Other gates shown directly controlled in FIG. 1 by counter CC also may be controlled by output lines from the selective switching means. By substituting different punched cards, or revising the register contents, the system may be readily re-adjusted for different classes of scanned objects, so as to provide different numbers of scanning fields, and to differently define density and/or density gradient ranges. The lines 27,28 leading from switching circuit SSM back into counter CC are to point out that the switching circuit may be arranged to cause counter CC to skip (or, if desired, to repeat) certain scanning fields.

It has been previously pointed out in connection with FIGS. 2b and 2c that the histograms obtained may vary substantially depending upon the manner in which the density gradient values are obtained. In a modification of FIG. 1 partially illustrated in FIG. 4, the output of differentiator 14 is passed through one or more portions of a tapped delay line DL before being applied to processor 16 or processor 18, and selective operation of switches DS1 and DS2 determine how much delay is inserted. Switches DS1 and DS2 are shown controlled by decoded outputs from counter CC, but could instead be controlled manually. Thus, in addition to the set of available histograms previously mentioned, further sets of histograms may be provided using different amounts of delay. The variable delay circuit can, if desired, be inserted in other configurations, with different data values being obtained in each case. In the position shown, the insertion of a slight delay advantageously tends to slightly integrate noise and extremely sharp spikes which may occur upon differentiation. Other possible locations of the delay are diagrammatically shown in FIGS. 4a and 4b. In FIG. 4a the camera 13 output signal is applied directly to switches ES1 and ES4, but delayed by device DL before being differentiated, so that the signal applied to switches ES2 and ES3 represents the gradient of a portion scanned slightly before the portion for which the camera 13 output represents the density gradient. In FIG. 4b the camera 13 output signal is applied to switches ES1 and ES4 through delay device DL, but applied directly to differentiator 14, so that the signal applied to switches ES1 and ES4 represents the density of a portion scanned slightly before the portion for which the differentiator 14 represents the density gradient.

To derive an even greater number of histograms characteristic of the scanned object, the system of the present invention may be expanded to incorporate the technique, shown in my further prior copending application Ser. No. 445,340 filed Feb. 25, 1974 and entitled "Pattern Analysis Method and Apparatus" of scanning the object with successively different scanning patterns, such as successive rasters oriented in different directions. In FIG. 1 knob 26 attached to slide 10 is deemed to represent a simple means for rotating the slide and scanned object in small angular increments about an axis such as the optical axis of microscope 12, though the axis of rotation need not accurately correspond to the optical axis, it only being required that the entire scanned object remain within the scanning field as the slide is turned in successive directions. It will be apparent that a stepping motor (not shown) may be arranged to rotate the slide. Alternatively, slide 10 may remain stationary and a stepping motor may be arranged to rotate a resolver (not shown) connected in known fashion to rotate the camera raster, or any of a number of all-electronic raster rotation techniques may be employed. For each different angular position of slide 10 relative to the direction of the scan lines, a further complete set of any or all of the previously-described histograms may be obtained, although there ordinarily will be no need to use a further scanning field for each angular direction while merely separately totalizing densities in the manner of the prior patent, since that method, in the absence of noise and system limitations will provide exactly the same histogram with the slide oriented in any direction.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Apparatus for analyzing a fixed pattern, comprising, in combination: scanning means for optically scanning said pattern to provide a first electrical waveform substantially commensurate with the light-remissivity of the portions of the pattern being scanned at a given instant and to provide a second electrical waveform substantially commensurate with the light-remissivity gradient of a portion of the pattern scanned substantially at said given instant; first detecting means for detecting those portions of said first electrical waveform which lie within a first pair of levels to provide signals of a first group, each of said signals of said first group having a duration commensurate with the time during which a respective one of said portions of said first electrical waveform lies within said first pair of levels; second detecting means for detecting those portions of said second electrical waveform which lie within a second pair of levels to provide signals of a second group, each of said signals of said second group having a duration commensurate with the time during which a respective one of said portions of said second electrical waveform lies within said second pair of levels; and accumulator means connected to be advanced throughout each simultaneous occurrence of a signal of said first group and a signal of said second group.

2. Apparatus according to claim 1 wherein said scanning means includes means for differentiating said first electrical waveform to provide said second electrical waveform.

3. Apparatus according to claim 1 wherein said scanning means includes delay means for providing a predetermined relative delay between said first and second electrical waveforms, whereby said second electrical waveform is commensurate with the light-remissivity gradient of a portion of said pattern displaced from said portion of said pattern scanned at said given instant.

4. Apparatus according to claim 3 having means for varying the delay period of said delay means.

5. Apparatus according to claim 3 wherein said scanning means includes means for differentiating said first electrical waveform to provide a third electrical waveform, and said delay means is operative to delay said third waveform to provide said second waveform.

6. Apparatus according to claim 3 wherein said scanning means is operative to provide a third electrical waveform substantially commensurate with the light-remissivity of the portion of the object being scanned at a given instant, said delay means is operative to delay said third waveform to provide said first electrical waveform, and said scanning means includes means for differentiating said first electrical waveform to provide said second electrical waveform.

7. Apparatus according to claim 3 wherein said delay means is operative to delay said first electrical waveform to provide a third electrical waveform, and said scanning means includes means for differentiating said third electrical waveform to provide said second waveform.

8. Apparatus according to claim 1 wherein said first detecting means is operative to detect those portions of said first electrical waveform which lies within each of a plurality of three or more ranges each defined by a respective pair of levels to provide a respective signal of said first group for each of said ranges, and said accumulator means comprises a plurality of accumulator devices each connected to be advanced during simultaneous occurrence of a signal of said second group and a respective one of said signals of said first group.

9. Apparatus according to claim 1 wherein said second detecting means is operative to detect those portions of said second electrical waveform which lie within each of a plurality of three or more ranges each defined by a respective pair of levels to provide a respective signal of said second group for each of said ranges, and said accumulator means comprises a plurality of accumulator devices each connected to be advanced during simultaneous occurrence of a signal of said first group and a respective one of said signals of said second group.

10. Apparatus according to claim 1 wherein said scanning means is operative to scan said pattern with a plurality of successive scanning fields each comprising a plurality of successive scan lines, and said apparatus includes field-counting control means for automatically varying at least one of said pairs of levels to different values for successive ones of said scanning fields.

11. Apparatus according to claim 10 wherein said control means comprises counter means and digital-to-analog converter means responsive to the count condition of said counter means.

12. Apparatus according to claim 11 having selective switching means for varying the response of said converter means to said contents of said counter means.

13. Apparatus according to claim 11 having selective switching means for varying the counting sequence of said counter means.

14. Apparatus according to claim 1 which includes clock pulse generating means and gating means responsive to said signals of said first and second groups for routing pulses from said pulse generating means to said accumulator means during each simultaneous occurrence of a signal of said first group and a signal of said second group.

15. Apparatus according to claim 14 wherein said scanning means is operative to scan said object with a plurality of successive scanning fields and said apparatus includes control means for varying the pulse repetition rate of said clock pulse generating means during successive scanning fields.

16. Apparatus according to claim 1 wherein said scanning means comprises a television camera arranged to view said pattern through a microscope as said pattern is illuminated by illuminator means positioned on the opposite side of said pattern from said microscope.

17. Apparatus according to claim 1 wherein said scanning means is operative to scan said pattern with a plurality of scan lines and said apparatus includes means for varying the direction of each of said scan lines across said pattern.

18. Apparatus according to claim 1 wherein said first detecting means is operative to detect those portions of said first electrical waveform which lie within each of a plurality of three or more ranges each defined by a respective pair of levels to provide a respective signal of said first group for each of said ranges, and said accumulator means comprises a plurality of accumulator devices, at least one of said accumulator devices comprising a reversible accumulator device connected to be driven in one direction during simultaneous occurrence of a signal of said second group and one of said signals of said first group and to be driven in an opposite direction during simultaneous occurrence of a signal of said second group and a second one of said signals of said first group.

19. Apparatus according to claim 1 wherein said second detecting means is operative to detect those portions of said second electrical waveform which lie within each of a plurality of three or more ranges each defined by a respective pair of levels to provide a respective signal of said second group for each of said ranges, and said accumulator means comprises a plurality of accumulator devices, at least one of said accumulator devices comprising a reversible accumulator device connected to be driven in one direction during simultaneous occurrence of a signal of said first group and one of said signals of said second group and to be driven in an opposite direction during simultaneous occurrence of a signal of said first group and a second one of said signals of said second group.

20. The method of analyzing a pattern comprised of a plurality of elemental areas arranged in a fixed geometrical relationship which comprises the steps of optically scanning said pattern to provide a first electrical waveform substantially commensurate with the light-remissivity of the portion of the pattern being scanned at a given instant and to provide a second electrical waveform substantially commensurate with the light-remissivity gradient of a portion of the object scanned substantially at said given instant; detecting those portions of said first electrical waveform which lie between a first pair of levels to provide respective first signals; detecting those portions of said second electrical waveform which lie between a second pair of levels to provide respective second signals; and combining said first and second signals to advance an accumulator means during a period during which one of said first signals coincides with one of said second signals.

* * * * *